April 19, 1960  J. K. CLARK  2,933,257
TEMPERATURE CONTROL SYSTEM
Filed April 30, 1956  2 Sheets-Sheet 1

INVENTOR.
JAMES K. CLARK
BY John P. Murphy
ATTORNEY

INVENTOR.
JAMES K. CLARK
BY John P. Murphy
ATTORNEY

United States Patent Office 2,933,257
Patented Apr. 19, 1960

2,933,257

TEMPERATURE CONTROL SYSTEM

James K. Clark, New Hartford, N.Y., assignor to The Partlow Corporation, New Hartford, N.Y., a corporation of New York Application April 30, 1956, Serial No. 581,610

2 Claims. (Cl. 236—80)

This invention relates to improvements in temperature control systems and in particular to a temperature control system having a built-in mechanical valve used in coordination with the thermostat for opening and closing a fuel line valve.

While the principle of the apparatus described may be used to regulate the temperature of various media by controlling the flow of a heating fluid, it is specifically designed for use in out-of-doors locations and in the presence of corrosive atmospheres.

One of the objects of the present invention is to provide a thermostatically operated valve with a minimum of moving parts exposed to the atmosphere or to gases within the valve which would corrode the parts and render the device less serviceable.

A further object of the invention resides in providing a valve which will open wide to provide full flow of the heating fluid on a small drop in temperature of the thermostat from the desired level as set on the dial of the control, and to completely close on a small rise of temperature above this level.

Another object of the invention is to provide a thermally controlled fluid flow valve in which the actual opening and closing of the valve is powered by the line pressure of the fluid under control.

A further object of this novel device is to provide a mechanism of the above-mentioned character which is simple and durable in construction, reliable and efficient in operation, and inexpensive to manufacture.

In accordance with the present invention, a temperature control system comprises a built-in mechanical valve which throttles the flow of a negligible amount of bleed gas from above a diaphragm located beneath, in the main gas valve, and discharge it, either to the combustion chamber, or to the atmosphere. The thermostatic element of the control valve is mercury filled. The bulb is carried in a socket which extends into the hot oil point of the heater or tank. The mercury in the bulb expands or contracts with the degree of temperature, and acts through a flexible capillary tube to position a plunger bearing upon a small pilot valve, which, in turn, controls the opening and closing of the diaphragm-controlled main valve. The pilot valve stem is adjustable by means of the control dial which shows the temperature setting. When the thermostatic element calls for heat, the pilot valve opens, thus allowing the accumulated gas pressure to bleed from the top of the diaphragm in the main gas valve and cause it to rise. With this, the main gas chamber opens and supplies the burner with fuel. When the desired temperature is reached, the pilot valve closes; gas pressure again accumulates on the top of the diaphragm and forces it down, to close the main gas chamber, thus closing the fuel supply to the burner.

This control valve handles gas pressures encountered in normal use. The mercury bulb element, its plunger, the linkage and the control dial adjustment are all isolated from contact with the bleed gas flow through the pilot valve, by means of diaphragms. All parts exposed to the gas flow are constructed from a suitable material, such as stainless steel, that is inherently self-protective against corrosive agents in the controlled fluid.

Other objects and advantages of the present invention will become more apparent as the description of the invention proceeds.

The preferred manner in which I desire to disclose my invention is herein shown in the accompanying drawings, in which.

Figure 1:
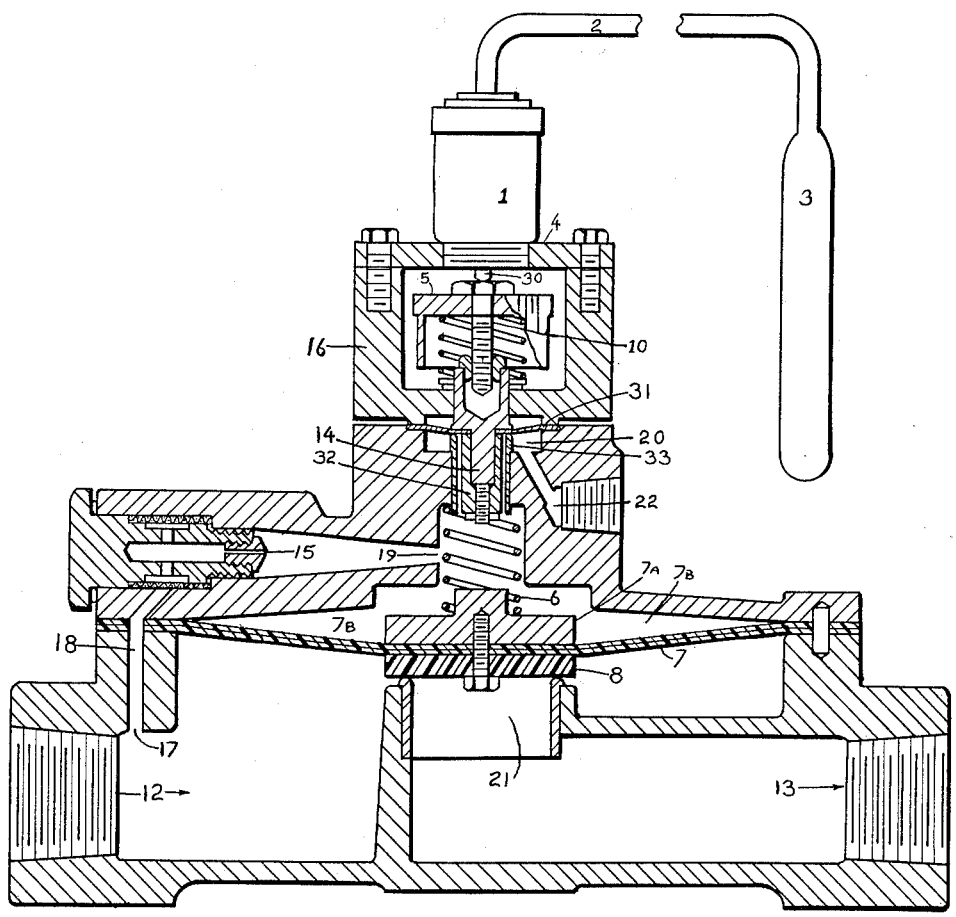
Figure 1 is a cross section view of the present invention illustrating the operative parts therein.

Figure 1 illustrates a thermostatic assembly represented as a whole by the reference character 16, and includes a liquid filled bulb 3 connected to an expansible member 1 by a capillary tube 2. The head of the thermostatic assembly is attached to the threaded flange plate 4 of the thermostatic assembly 16.

Expansion of the mercury or other fluid in the thermostat bulb acts through the capillary tube to move the thermostat plunger 30. The plunger 30 bears upon the top of the control dial stem 10 which is adjustably fitted to the graduated temperature set dial 5. The dial stem 10 is longitudinally concentric with and threaded into the pilot valve stem 14, thereby providing the means for adjusting the controlled temperature setting. A small flexible diaphragm 31 is clamped in a pressure tight manner between component parts of the valve stem 14 and extends across the top of the pilot valve chamber 20, thus effectively sealing internal parts of the valve mechanism from the atmosphere. The lower part of the pilot valve stem 14 forms a guide 32, suitably shaped in cross section so as to provide a gas passage longitudinally between the guide 32 and its surrounding seat 33 from recess 7B to the pilot valve chamber 20. The guide 32 projects upwardly into the chamber 20 to provide the seat of the pilot valve represented by the reference character 33, against which upper diaphragm 31 can bear to prevent the escape of bleed gas from the chamber 20 through the passage 22 to the atmosphere.

Figure 2:
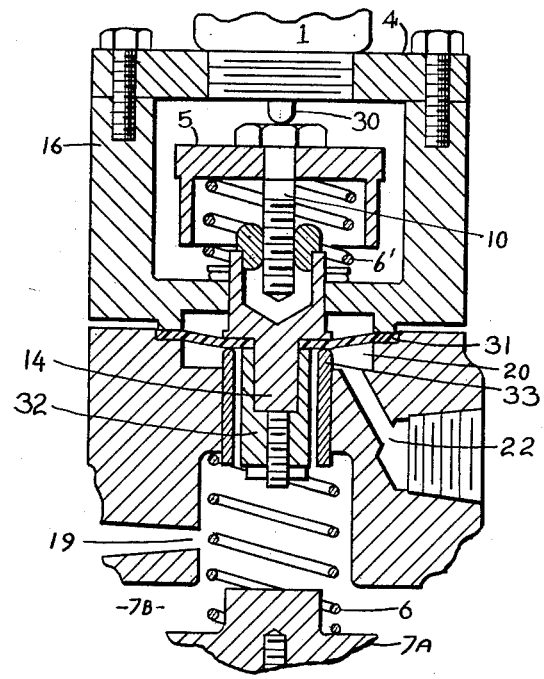
Figure 2 is a cross section of the invention, in part, showing an enlarged view of the control valve assembly.

As clearly illustrated in Figures 1 and 2, the main disc valve 8 having a diaphragm 7 and weight 7A, supports a spring 6; the opposite end of which spring 6 bears on the recess 7B in the body. The main disc valve 8 opens and closes the main gas chamber 21 which supplies the burner with fuel from the source connected thereto by the inlet 12 through the outlet 13 connected to the burner.

Figure 3:
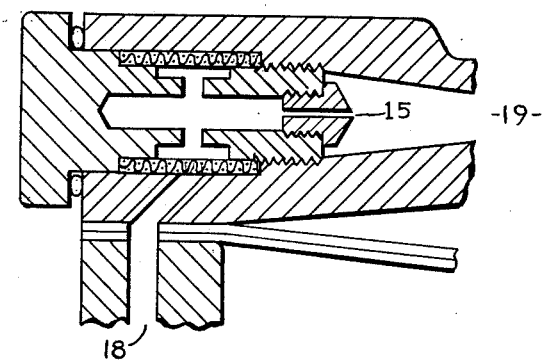
Figure 3 is an enlarged cross section view of the invention, in part, showing the bleed gas passage with respect to the operation of the orifice.

As seen in Figure 3, the bleed gas orifice 15 of predetermined size is connected by a passage 18, from the inlet 12 at the opening 17 to the opening 19. The pilot valve throttles the flow of the bleed gas from above the diaphragm 7 of the main disc valve 8, through the bleed gas orifice 15 into the pilot valve chamber 20. From here, the flow of the bleed gas is either discharged to the combustion chamber, or to the atmosphere through the opening 22 connecting the pilot valve chamber 20 to the atmosphere.

The operation of the system is as follows:

In the present invention, the bulb of the thermostatic element is positioned at a pre-determined hot oil control point and connected to the oil tank or heater. The flexible capillary tube or other such suitable connection, carries the action of the thermostatic element to the control valve 16. When the thermostatic element calls for heat, according to the setting of the dial 5, the thermostat plunger 30 rises, allowing the control dial stem 10 to rise. With this action, the pilot valve stem 14 is raised by the spring 6, forcing it upward. As a result, the accumulated gas pressure in the recess 7B is allowed to bleed into the passage 22, escaping into the atmosphere, thus the gas pressure on the top of the diaphragm 7 is reduced and causes the main disc valve 8 to rise as the diaphragm 7 rises in response to the reduction in pressure above diaphragm 7. With the main disc valve 8 in this open position, the fuel from the inlet 12 enters the burner, passes through the chamber 21 and through the outlet 13 to the burner.

When the desired temperature is reached according to the setting of the control dial 5, the mercury expands and acts upon the plunger 30, which forces the control dial stem 10 to bear upon the pilot valve stem 14 thus causing the pilot valve to close. With this action, the bleed gas is again accumulated over the diaphragm 7, forcing the main disc valve 8 down, to close the main gas chamber 21, thus shutting off the supply of fuel through the outlet 13 connected to the burner.

All of the parts of the temperature control system of the present invention which are exposed to the flow of fluid are of stainless steel or cast gray iron, and moving parts, such as the diaphragm, are made of nylon-Hycar or other similar anti-corrosive materials.

While certain novel features of the invention have been disclosed and are pointed out in the annexed claims, it will be understood that various ommissions, substitutions and changes may be made by those familiar in the art without departing from the spirit and scope of the invention.

I claim:

1. A control assembly for metering a corrosive pressurized fluid in response to a temperature condition to be controlled comprising a main chamber including an inlet and outlet for the corrosive fluid being controlled, a valve seat in said main chamber between said inlet and outlet through which the controlled corrosive fluid will flow, a flexible, pressure responsive diaphragm overlying said main chamber and valve seat and including a central valve portion engageable therewith, said flexible diaphragm defining a control chamber above said main chamber, bleed passage means communicating between said main chamber and said control chamber at said inlet to impose inlet pressure above said diaphragm, spring means acting on said diaphragm biasing said valve portion toward seated relation on said valve seat, thermal-responsive force-transmitting means on said assembly, an outlet passage in communication with said control chamber, a second valve seat interposed between said control chamber and said outlet passage, a second flexible, pressure-responsive diaphragm overlying said second valve seat and engageable therewith to control corrosive fluid flow therebetween, a pilot valve stem sealingly engaged with said second diaphragm and movable relative to said second valve seat with said second diaphragm, said second diaphragm maintaining the corrosive fluid therebeneath, and spring means in engagement with said pilot valve stem and biasing the same with the second flexible diaphragm away from said second valve seat, said pilot valve stem being engageable by said thermal-responsive force-transmitting means above said second diaphragm to urge the pilot valve stem and second diaphragm toward seated relation relative to said second valve seat.

2. The assembly of claim 1 in which said pilot valve stem includes an adjustable portion engageable with said force-transmitting means for determining when the control chamber and outlet passage will communicate.

References Cited in the file of this patent

UNITED STATES PATENTS

| | | |
|---|---|---|
| 1,804,849 | Thompson | May 12, 1931 |
| 1,812,346 | Kuenhold | June 30, 1931 |
| 1,949,030 | Stockmeyer | Feb. 27, 1934 |
| 2,118,886 | Joesting | May 31, 1938 |
| 2,178,974 | Smith et al. | Nov. 7, 1939 |
| 2,247,060 | Levine et al. | June 24, 1941 |
| 2,328,323 | Bowers et al. | Aug. 31, 1943 |
| 2,504,689 | Hopp | Apr. 18, 1950 |
| 2,539,106 | Schenck | Jan. 23, 1951 |
| 2,676,757 | Thornbery | Apr. 27, 1954 |

FOREIGN PATENTS

| | | |
|---|---|---|
| 455,717 | Germany | Feb. 10, 1928 |